United States Patent

Takeo

[11] Patent Number: 5,081,580
[45] Date of Patent: Jan. 14, 1992

[54] METHOD FOR RECOGNIZING AN IRRADIATION FIELD, AND METHOD FOR JUDGING THE CORRECTNESS OR INCORRECTNESS OF PROSPECTIVE CONTOUR POINTS OF AN IRRADIATION FIELD

[75] Inventor: Hideya Takeo, Kanagawa, Japan

[73] Assignee: Fuji Photo Film Co., Ltd., Kanagawa, Japan

[21] Appl. No.: 340,818

[22] Filed: Apr. 20, 1989

[30] Foreign Application Priority Data

Apr. 20, 1988 [JP] Japan .................................. 63-97898
Jul. 28, 1988 [JP] Japan .................................. 63-188978
Aug. 31, 1988 [JP] Japan .................................. 63-217590
Aug. 31, 1988 [JP] Japan .................................. 63-217591

[51] Int. Cl.$^5$ .............................................. H04N 5/30
[52] U.S. Cl. ............................. 364/413.13; 364/413.23
[58] Field of Search ...................... 364/413.13, 413.14, 364/413.19, 413.23

[56] References Cited

U.S. PATENT DOCUMENTS

| | | | |
|---|---|---|---|
| 4,101,961 | 7/1978 | Reiber ................................ | 364/413 B |
| 4,392,120 | 7/1983 | Mita et al. ........................... | 382/22 |
| 4,527,060 | 7/1985 | Suzuki et al. ....................... | 250/327.2 |
| 4,627,096 | 12/1986 | Grattoni et al. ................... | 382/8 |
| 4,682,028 | 7/1987 | Tanaka et al. .................... | 250/327.2 |
| 4,851,984 | 7/1989 | Doi et al. ........................... | 364/413.23 |

FOREIGN PATENT DOCUMENTS 0170270 7/1985 European Pat. Off. .

OTHER PUBLICATIONS

"An Image Processing Method for Feature Extraction of Space-Occuping Lesions" *Systems-Computers-Controls*, vol. 12, No. 4, Jul./Aug. 1981, pp. 10-18, Scripta Publishing Co., Silver Spring, MD, US.

K. Honma et al., "An Image Processing Method for Feature Extraction of Space-Occupying Lesions" *Journal of Nuclear Medicine*, vol. 26, No. 12, Dec. 1985, pp. 1472-1477, New York, NY, U.S., K. Homma et al.

*Primary Examiner*—Jerry Smith
*Assistant Examiner*—Russell E. Cass
*Attorney, Agent, or Firm*—Sughrue, Mion, Zinn Macpeak & Seas

[57] ABSTRACT

A method for recognizing an irradiation field on a recording medium comprises the steps of, on each of radial lines each of which connects a point located in the irradiation field with an edge of the recording medium, detecting prospective contour points, each of which is considered to be an intersection of each line and a contour of the irradiation field, together with their prospectiveness ranks, based on the image signal components corresponding to the picture elements arrayed along each line. When the prospective contour points thus detected are present in both peripheral and center regions of the recording medium, and a prospective contour point standing in the first rank is present in the peripheral region, the first rank is given to a prospective contour point which is in the highest rank among the prospective contour points located in the center region. The irradiation field is recognized based on the first-ranking prospective contour points thus determined on the lines.

8 Claims, 8 Drawing Sheets

METHOD FOR RECOGNIZING AN IRRADIATION FIELD, AND METHOD FOR JUDGING THE CORRECTNESS OR INCORRECTNESS OF PROSPECTIVE CONTOUR POINTS OF AN IRRADIATION FIELD

BACKGROUND OF THE INVENTION

1. Field of the Invention

This invention relates to a method for recognizing an irradiation field on a recording medium on the basis of an image signal comprising a plurality of image signal components corresponding to picture elements on the recording medium on which a radiation image of an object has been recorded. This invention also relates to a method for judging the correctness or incorrectness of a prospective contour point, which has been detected as being present on a contour of an irradiation field on a recording medium on the basis of an image signal comprising a plurality of image signal components corresponding to picture elements on the recording medium on which a radiation image of an object has been recorded.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value designed so as to match the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays, such as a laser beam, which cause it to emit light in proportion to the amount of energy stored during exposure to the radiation. The light emitted by the stimulable phosphor sheet upon stimulation thereof is photoelectrically detected and converted into an electric image signal, and by using the image signal the radiation image of the object is reproduced as a visible image on a recording material such as a photographic film, a display device such as a cathode ray tube (CRT), or the like.

Radiation image recording and reproducing systems which use stimulable phosphor sheets are advantageous over conventional radiography using silver halide photographic materials in that images can be recorded even when the energy intensity of the radiation to which the stimulable phosphor sheet is exposed varies over a wide range. More specifically, since the amount of light emitted upon stimulation after the radiation energy is stored on the stimulable phosphor varies over a wide range and is proportional to the amount of energy stored during exposure to the radiation, it is possible to obtain an image having a desirable density regardless of the energy intensity of the radiation to which the stimulable phosphor sheet was exposed, by setting an appropriate read-out gain when detecting the emitted light and converting it into an electric signal to be used in reproduction of a visible image on a recording material or a display device.

In order to detect an image signal accurately, certain factors which affect the image signal must be set in accordance with the dose of radiation delivered to the stimulable phosphor sheet and the like. A novel radiation image recording and reproducing system which accurately detects an image signal has been proposed in, for example, Japanese Unexamined Patent Publication Nos. 58(1983)-67240, 58(1983)-67241 and 58(1983)-67242. The proposed radiation image recording and reproducing system is constituted such that a preliminary read-out operation (hereinafter simply referred to as "preliminary read out") is carried out for approximately ascertaining the radiation image stored on the stimulable phosphor sheet. In the preliminary read out, the stimulable phosphor sheet is scanned with a light beam having a comparatively low energy level, and a preliminary read-out image signal obtained during the preliminary read out is analyzed. Thereafter, a final read-out operation (hereinafter simply referred to as "final read out") is carried out for obtaining the image signal, which is to be used during the reproduction of a visible image. In the final read out, the stimulable phosphor sheet is scanned with a light beam having an energy level higher than the energy level of the light beam used in the preliminary read out, and the radiation image is read out with the factors affecting the image signal adjusted to appropriate values on the basis of the results of a analysis of the preliminary read-out image signal.

The term "read-out condition" as used hereinafter means a group of various factors, which are adjustable and which affect the relationship between the amount of light emitted by the stimulable phosphor sheet during image read out and the output of a read-out means. For example, the term "read-out condition" may refer to a read-out gain and a scale factor which define the relationship between the input to the read-out means and the output therefrom, or the power of the stimulating rays used when the radiation image is read out.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam, i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary read out is or is not carried out, it has also been proposed to analyze the image signal (including the preliminary read-out image signal) obtained and to adjust an image processing condition, which is to be used when the image signal is processed, on the basis of the results of an analysis of the image signal. The proposed method is applicable to cases where an image signal is obtained from a radiation image recorded on a recording medium such as conventional X-ray film, as well as to the systems using stimulable phosphor sheets.

Various methods have been proposed for calculating how the read-out condition for final read out and/or the image processing condition should be adjusted on the basis of an analysis of the image signal (including the preliminary read-out image signal). As one of such methods, it has been proposed in, for example, Japanese Unexamined Patent Publication No. 60(1985)-156055 to create a histogram of the image signal. When a histogram of the image signal is created, the characteristics of a radiation image recorded on a recording medium such as a stimulable phosphor sheet or X-ray film can be ascertained based on, for example, the maximum value of the image signal, the minimum value of the image signal, or the value of the image signal at which the histogram is maximum, i.e. the value which occurs most frequently. Therefore, if the read-out condition for the final read out, such as the read-out gain or the scale factor, and/or the image processing condition such as the gradation processing condition or the frequency response processing condition is based on an analysis of the histogram of the image signal, it becomes possible to reproduce a visible image suitable for viewing, particularly for diagnostic purposes.

On the other hand, in the course of radiation image recording, it is often desirable for portions of the object not related to a diagnosis or the like to be prevented from being exposed to radiation. Further, when the object portions not related to a diagnosis or the like are exposed to radiation, the radiation is scattered by such portions to the portion that is related to a diagnosis or the like, and the image quality is adversely affected by the scattered radiation. Therefore, when a radiation image is recorded on the recording medium, an irradiation field stop is often used for limiting the irradiation field to an area smaller than the overall recording region of the recording medium so that radiation is irradiated only to that portion of the object which is to be viewed.

However, in cases where the read-out condition for the final read out and/or the image processing condition is calculated on the basis of the results of an analysis of the image signal in the manner described above and the image signal is detected from a recording medium, on which a radiation image has been recorded by limitation of the irradiation field, the radiation image cannot be ascertained accurately if the image signal is analyzed without the shape and location of the irradiation field being taken into consideration. As a result, an incorrect read-out condition and/or an incorrect image processing condition is set, so that a visible radiation image suitable for viewing, particularly for diagnostic purposes, cannot be reproduced.

In order to eliminate the aforesaid problem, it is necessary to recognize the shape and location of an irradiation field and then to calculate the read-out condition for the final read out and/or the image processing condition on the basis of only the image signal representing image information stored in the region inside of the irradiation field.

Accordingly, the applicant has proposed in, for example, Japanese Patent Application No. 62(1987)-93633 a novel method capable of accurately recognizing an irradiation field even when the irradiation field has an irregular shape. The proposed method comprises the steps of detecting a prospective contour point, which is considered to be present on a contour of the irradiation field, on each of a plurality of radial lines each of which connects a predetermined point located in the region inside of the irradiation field with an edge of a recording medium, and recognizing a region surrounded by lines connecting the thus detected prospective contour points as the irradiation field.

In cases where the irradiation field is first detected and then the image signal representing the image information recorded in the region inside of the detected irradiation field is analyzed in the manner as that described above, an appropriate read-out condition and/or an appropriate image processing condition is determined.

However, in cases where the image of a foreign substance such as a lead protector for blocking radiation or a member for fixing an object during the image recording is recorded together with the image of the object on a recording medium, operations for finding the irradiation field cannot often be carried out accurately. In such cases, the read-out condition for the final read out and/or the image processing condition is determined on the basis of the image signal representing image information stored in the region inside of the irradiation field recognized incorrectly. Therefore, a visible radiation image suitable for viewing, particularly for diagnostic purposes, cannot be reproduced even though the operations for recognizing the irradiation field were carried out.

SUMMARY OF THE INVENTION

The primary object of the present invention is to provide a method for recognizing an irradiation field, which accurately recognizes the irradiation field when the image of a foreign substance was recorded together with the image of an object during the image recording.

Another object of the present invention is to provide a method for judging the correctness or incorrectness of a prospective contour point of an irradiation field, which judges whether a prospective contour point detected as being present on a contour of the irradiation field is truly present on the contour of the irradiation field.

The present invention provides a method for recognizing an irradiation field wherein an image signal comprising a plurality of image signal components corresponding to picture elements on a recording medium (such as a stimulable phosphor sheet or a sheet of photographic film), on which a radiation image of an object has been recorded, is obtained, and an irradiation field on the recording medium is recognized on the basis of the image signal components, wherein the improvement comprises the steps of:

i) on each of a plurality of radial lines each of which connects a predetermined point located in the region inside of said irradiation field on said recording medium with an edge of said recording medium, detecting a single prospective contour point, which is considered to be an intersection of each said line and a contour of said irradiation field on said recording medium or a plurality of such prospective contour points, together with prospectiveness ranks of the prospective contour points, on the basis of the image signal components corresponding to the picture elements arrayed along each said line, ii) in cases where said prospective contour points detected on each said line are present in both a predetermined peripheral region close to the edge of said recording medium and a center region on the inward side of said peripheral region, and a prospective contour point standing in the first prospectiveness rank is present in said peripheral region, changing the prospectiveness ranks of said prospective contour points so that the first prospectiveness rank is given to a prospective contour point which is in the highest rank among the prospective contour points located in said center region, and iii) recognizing said irradiation field on the basis of the first-ranking prospective contour points which are thus determined on said lines.

The inventor carried out statistical investigation of many radiation images and found that, in most cases, the irradiation field is located in the vicinity of the center of the recording medium, and the image of a foreign substance recorded together with the image of an object is located in the peripheral region of the recording medium.

The method for recognizing an irradiation field in accordance with the present invention is based on the aforesaid findings With the method for recognizing an irradiation field in accordance with the present invention, a single prospective contour point or a plurality of prospective contour points are detected together with prospectiveness ranks of the prospective contour points on each of a plurality of radial lines each of which connects a predetermined point located in the region inside of an irradiation field on a recording medium with an edge of the recording medium. In cases where a prospective contour point is present in the center region of the recording medium, any prospective contour point located in the peripheral region of the recording medium is ignored. Therefore, when the image of a foreign substance is present in the peripheral region of the recording medium, points detected as prospective contour points at the image of the foreign substance are eliminated from the prospective contour points. Accordingly, the irradiation field can be recognized accurately.

The present invention also provides a first method for judging the correctness or incorrectness of a prospective contour point of an irradiation field, which comprises the steps of, after image read out from a recording medium (such as a stimulable phosphor sheet or a sheet of photographic film), on which a radiation image of an object has been recorded, is carried out in order to obtain an image signal comprising a plurality of image signal components corresponding to picture elements on the recording medium:

i) on a line which connects a predetermined point located in the region inside of an irradiation field on said recording medium with an edge of said recording medium, detecting prospective contour points, each of which is considered to be an intersection of said line and a contour of said irradiation field, on the basis of the image signal components corresponding to the picture elements arrayed along said line, ii) detecting a change point of said image signal components arrayed along said line, which change point arises characteristically only in the region inside of said irradiation field, and iii) in cases where said change point has been detected, judging that a prospective contour point located on the predetermined point side of said change point is not present on the contour of said irradiation field and is thus incorrect.

During the image recording, the region outside of the irradiation field on the recording medium was exposed only to scattered radiation. Therefore, in cases where the values of the image signal components are proportional to the amount of radiation which impinged upon the recording medium, the values of the image signal components corresponding to the region outside of the irradiation field are small. Also, in the region outside of the irradiation field, the values of the image signal components corresponding to adjacent picture elements do not differ so much, i.e. are approximately uniform. On the other hand, the region inside of the irradiation field was positively exposed to radiation during the image recording. Therefore, the values of the image signal components corresponding to the region inside of the irradiation field are large, and change sharply at the contour of the irradiation field. Accordingly, in cases where a prospective contour point detected is truly present on the contour of the irradiation field, the values of the image signal components corresponding to the region on the outward side of the prospective contour point do not exceed a predetermined value, and the values of the image signal components corresponding to adjacent picture elements in said region do not differ so much.

The first method for judging the correctness or incorrectness of a prospective contour point of an irradiation field in accordance with the present invention is based on the aforesaid findings. With the first method for judging the correctness or incorrectness of a prospective contour point of an irradiation field in accordance with the present invention, prospective contour points on a line, which connects a predetermined point located in the region inside of an irradiation field on the recording medium with an edge of the recording medium, and a change point which arises characteristically only in the region inside of the irradiation field are detected. In cases where the change point is detected and a prospective contour point is detected on the predetermined point side of the change point (i.e. on the inward side of the irradiation field), it is judged that said prospective contour point is not present on the contour of the irradiation field and is thus incorrect. Accordingly, it becomes possible to determined an appropriate read-out condition for the final read out and/or an appropriate image processing condition.

In cases where a prospective contour point detected is judged to be incorrect, a prospective contour point may then be detected on the outward side of the aforesaid change point. Alternatively, the line on which the prospective contour point judged to be incorrect was detected may be ignored, and the irradiation field may be recognized on the basis of a plurality of prospective contour points detected as being correct on other lines.

The present invention further provides a second method for judging the correctness or incorrectness of a prospective contour point of an irradiation field, which comprises the steps of, after image read out from a recording medium (such as a stimulable phosphor sheet or a sheet of photographic film), on which a radiation image of an object has been recorded, is carried out in order to obtain an image signal comprising a plurality of image signal components corresponding to picture elements on the recording medium:

i) on a line which connects a predetermined point located in the region inside of an irradiation field on said recording medium with an edge of said recording medium, detecting a prospective contour point, which is considered to be an intersection of said line and a contour of said irradiation field, on the basis of the image signal components corresponding to the picture elements arrayed along said line, ii) in cases where said prospective contour point has been detected, calculating a characteristic value of the image signal components corresponding to the picture elements arrayed along a single line or along each of a plurality of lines, each of which line extends from said prospective contour point to the direction that goes away from said predetermined point, iii) comparing said characteristic value with a predetermined value, and iv) based on the results of the comparison of said characteristic value with said predetermined value, judging whether said prospective contour point is truly present on the contour of said irradiation field or is not present on the contour of said irradiation field and is thus incorrect.

The line which extends from the prospective contour point to the direction that goes away from the predetermined point need not necessarily be the extension of the line connecting the predetermined point with the prospective contour point.

Also, the term "characteristic value of image signal components" as used herein means the value calculated by an operating process which discriminates between the regions inside and outside of the irradiation field by utilizing the characteristics that, in the region outside of the irradiation field, the mean amount of radiation to which the region is exposed is smaller than in the region inside of the irradiation field, and/or the image is approximately uniform and exhibits little change. For example, the characteristic value may be the mean value of the values of the image signal components corresponding to the picture elements arrayed along the line, the median value of the values of said image signal components, the maximum value among the values of said image signal components, the value of the formula expressed as (maximum value among the values of said image signal components+minimum value among the values of said image signal components)/2, the variance of the values of said image signal components, the mean value of the absolute values of the differentiated values which are obtained from differentiation of the values of said image signal components along said line, or the variance of said differentiated values. Also, the image signal components the characteristic value of which is calculated may be proportional or inversely proportional to the amount of radiation to which the recording medium was exposed. Alternatively, said image signal components may be proportional or inversely proportional to the logarithmic value of the amount of radiation to which the recording medium was exposed.

As described above, in cases where a prospective contour point detected is truly present on the contour of the irradiation field, the values of the image signal components corresponding to the region on the outward side of the prospective contour point do not exceed a predetermined value, and the values of the image signal components corresponding to adjacent picture elements in said region do not differ so much.

The second method for judging the correctness or incorrectness of a prospective contour point of an irradiation field in accordance with the present invention is based on the aforesaid findings. With the second method for judging the correctness or incorrectness of a prospective contour point of an irradiation field in accordance with the present invention, a calculation is made to obtain a characteristic value (for example, the mean value) of the image signal components corresponding to the picture elements arrayed along a single line or along each of a plurality of lines, each of which line extends from the prospective contour point to the direction that goes away from the predetermined point located in the region inside of the irradiation field. The characteristic value is compared with a predetermined value. Based on the results of the comparison of the characteristic value with the predetermined value, judgment is made as to whether the prospective contour point is or is not correct. For example, the prospective contour point is judged to be correct when said mean value is smaller than the predetermined value, and is judged to be incorrect when said mean value is larger than the predetermined value. In this manner, the irradiation field can be recognized more accurately. Accordingly, it becomes possible to determine an appropriate read-out condition for the final read out and/or an appropriate image processing condition.

In cases where a prospective contour point detected is judged to be incorrect, a prospective contour point may then be detected on the outward side of the prospective contour point judged to be incorrect. Alternatively, the line on which the prospective contour point judged to be incorrect was detected may be ignored, and the irradiation field may be recognized on the basis of a plurality of prospective contour points detected as being correct on other lines.

Also, only a single line may be employed as the line which extends from the prospective contour point to the direction that goes away from the predetermined point located in the region inside of the irradiation field. However, in order to judge more accurately, for example, in order to make judgment under majority rule when the results of judgment differ among the lines, operations should preferably be carried out along a plurality of lines extending from the prospective contour point to different directions that go away from the predetermined point.

In preferred embodiments of the method for recognizing an irradiation field and the first and second methods for judging the correctness or incorrectness of a prospective contour point of an irradiation field in accordance with the present invention, light which is obtained from the picture elements on the recording medium and which represents the radiation image recorded on the recording medium is photoelectrically detected and converted into an image signal. The term "light obtained from picture elements on a recording medium and representing a radiation image" as used herein embraces light emitted by a stimulable phosphor sheet when it is exposed to stimulating rays, and light which has passed through a sheet of photographic film or is reflected therefrom.

DESCRIPTION OF THE PREFERRED EMBODIMENTS

The present invention will hereinbelow be described in further detail with reference to the accompanying drawings.

Figure 4:
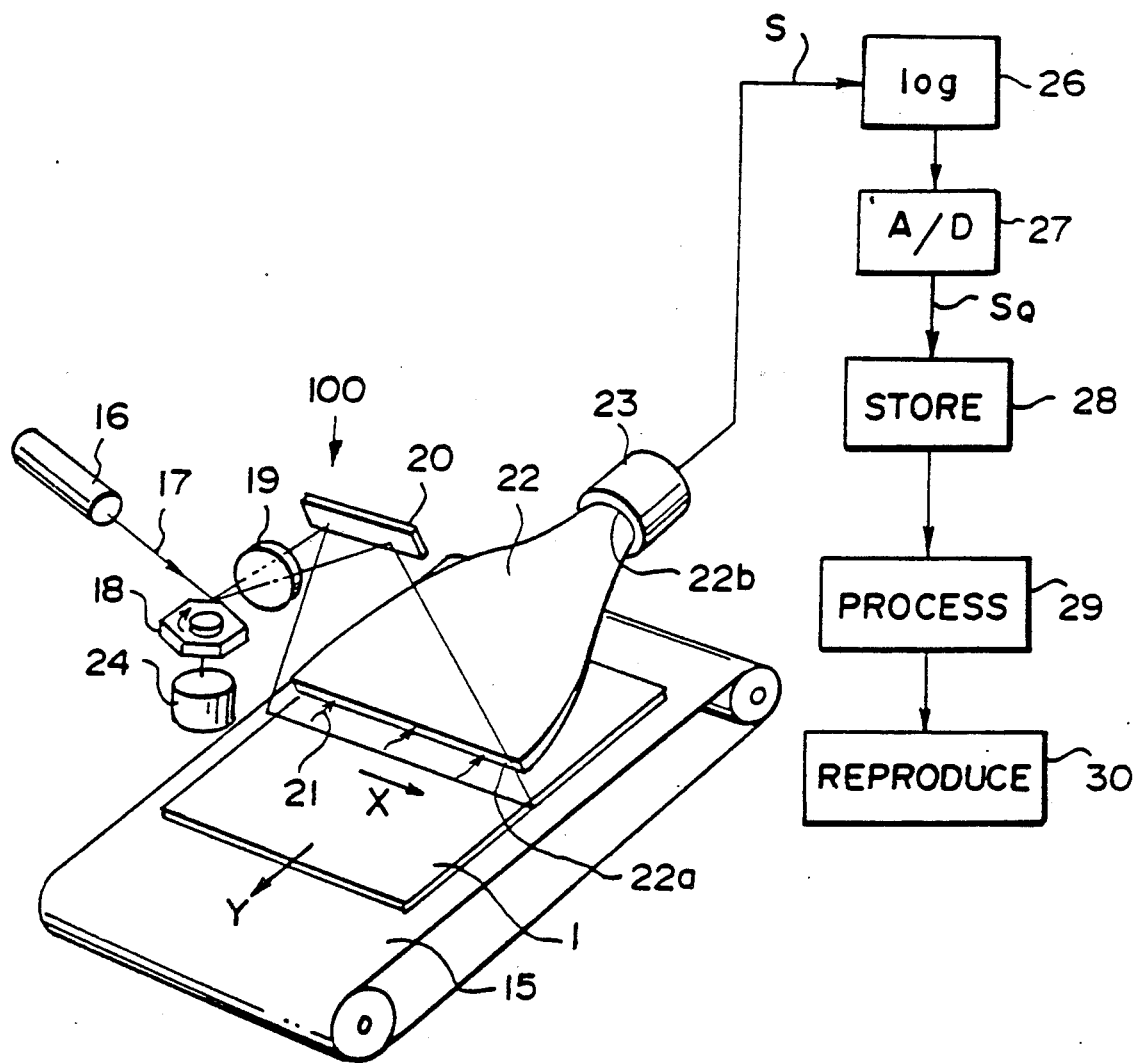
FIG. 4 is a perspective view showing an example of the radiation image read-out and reproducing apparatus wherein an embodiment of the method for recognizing an irradiation field in accordance with the present invention is employed.

With reference to FIG. 4, a radiation image read-out and reproducing apparatus, wherein an embodiment of the method for recognizing an irradiation field in accordance with the present invention is employed, utilizes a stimulable phosphor sheet.

A stimulable phosphor sheet 1 on which a radiation image has been stored is placed at a predetermined position in a read-out means 100. The stimulable phosphor sheet 1 is conveyed in a sub-scanning direction indicated by the arrow Y by a sheet conveyance means 15 which is constituted of an endless belt or the like and which is operated by an operating means (not shown). On the other hand, a laser beam 17 produced by a laser beam source 16 is reflected and deflected by a rotating polygon mirror 18 which is being quickly rotated by a motor 24 in the direction indicated by the arrow, and caused to pass through a converging lens 19 constituted of an fθ lens or the like. The direction of the optical path of the laser beam 17 is then changed by a mirror 20, and the laser beam 17 is caused to impinge upon the stimulable phosphor sheet 1 and scan it in a main scanning direction indicated by the arrow X, which direction is approximately normal to the sub-scanning direction indicated by the arrow Y. When the stimulable phosphor sheet 1 is exposed to the laser beam 17, the exposed portion of the stimulable phosphor sheet 1 emits light 21 in an amount proportional to the amount of energy stored thereon during exposure to radiation. The emitted light 21 is guided by a light guide member 22, and photoelectrically detected by a photomultiplier 23. The light guide member 22 is made by the forming of a light guiding material such as an acrylic plate, and has a linear light input face 22a positioned to extend along the main scanning line on the stimulable phosphor sheet 1, and a ring-shaped light output face 22b positioned so that it is in close contact with a light receiving face of the photomultiplier 23. The emitted light 21 which has entered the light guide member 22 from its light input face 22a is guided through repeated total reflection inside of the light guide member 22, emanates from the light output face 22b, and is received by the photomultiplier 23. In this manner, the amount of the emitted light 21 carrying the radiation image is converted into an electric signal by the photomultiplier 23.

A analog output signal S generated by the photomultiplier 23 is logarithmically amplified by a logarithmic amplifier 26, and digitized by an A/D converter 27 into an image signal SQ which comprises image signal components corresponding to the picture elements of the radiation image. The image signal SQ thus obtained is stored in a storage means 28, and then read therefrom by an image processing means 29.

On each of a plurality of radial lines each of which connects a predetermined point located in the region inside of an irradiation field on the stimulable phosphor sheet 1 with an edge of the stimulable phosphor sheet 1, the image processing means 29 detects a single prospective contour point, which is considered to be an intersection of each line and a contour of the irradiation field on the stimulable phosphor sheet 1, or a plurality of such prospective contour points, together with prospectiveness ranks of the prospective contour points, on the basis of the components of the image signal SQ corresponding to the picture elements arrayed along each line. Thereafter, the image processing means 29 recognizes the region surrounded by the lines, which connect the prospective contour points thus detected, as the irradiation field. After recognizing the irradiation field, the image processing means 29 carries out appropriate image processing on the image signal SQ corresponding to the region inside of the irradiation field.

After being image processed, the image signal SQ is fed into a reproduction means 30 which reproduces a visible image from the image signal SQ.

How the image processing means 29 recognizes the irradiation field based on the image signal SQ will be described hereinbelow.

Figure 1:
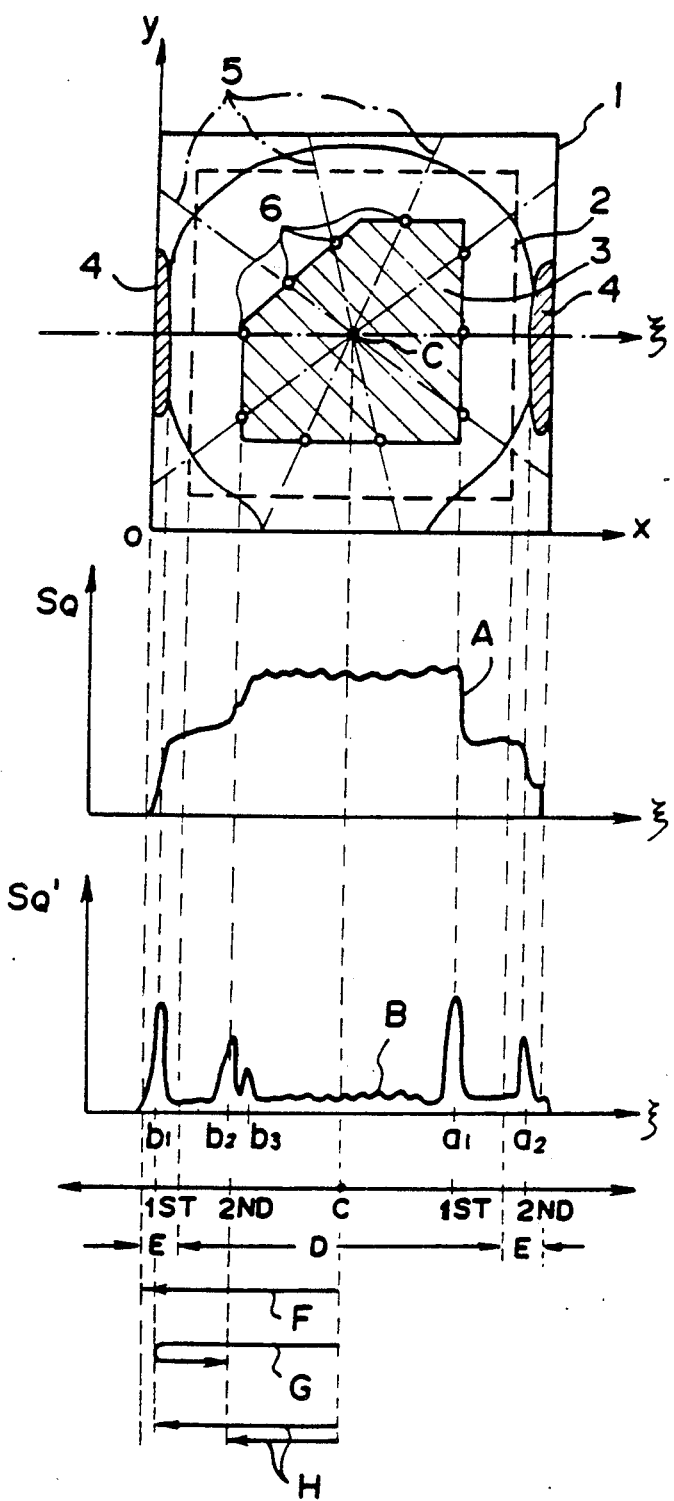
FIG. 1 is an explanatory view showing an example of the radiation image and a image signal representing the radiation image.

For the explanation of the embodiment of the method for recognizing an irradiation field in accordance with the present invention, FIG. 1 shows an example of the radiation image and the image signal SQ representing the radiation image.

With reference to FIG. 1, an object image 2 of the head of a human body as an object is stored on the stimulable phosphor sheet 1. In order to expose only the portion of the head, which portion is related to a diagnosis, to radiation, an irradiation field stop is used during the image recording so that an irradiation field 3 is formed at the center region of the stimulable phosphor sheet 1. Also, ear fixing members are used to fix the head at the ears during the image recording, so that images 4, 4 of the ear fixing members are recorded at both edges of the stimulable phosphor sheet 1. The irradiation field stop is used for the purpose of exposing only the portion of the object, which portion is related to a diagnosis, to radiation. However, scattered radiation impinges upon the region outside of the irradiation field 3, so that the energy of the scattered radiation is stored in the region outside of the irradiation field 3.

In this embodiment, the center point C of the stimulable phosphor sheet 1 is selected as a predetermined point located in the region inside of the irradiation field 3. Differentiating operations are carried out on the image signal components of the image signal SQ corresponding to the picture elements arrayed along each of a plurality of lines 5, 5, ... which extend radially from the center point C. The point at which the value of the image signal SQ decreases sharply is detected as a prospective contour point.

How the prospective contour point is detected along the $\xi$ axis which is one of the lines 5, 5, ... will be described hereinbelow.

Curve A represents the values of the image signal components of the image signal SQ corresponding to the picture elements arrayed along the $\xi$ axis.

The values of the image signal components are large in the region inside of the irradiation field 3, and decrease sharply at the contour of the irradiation field 3. At the ear fixing members, radiation is blocked by the ear fixing members and the irradiation field stop. Therefore, the values of the image signal components corresponding to the images 4, 4 of the ear fixing members further decrease.

Curve B represents the results of differentiation carried out on the image signal components represented by curve A from the center point C to the positive direction of the $\xi$ axis (i.e. rightward in FIG. 1) and to the negative direction of the $\xi$ axis (i.e. leftward in FIG. 1). The extents to which the values of the image signal components decreases sharply are indicated as peaks of curve B.

Curve B has two major peaks a1 and a2 in the region extending from the center point C to the positive direction of the $\xi$ axis. The peak a1 is higher than the peak a2. On the line extending from the center point C to the positive direction of the $\xi$ axis, the peak a1 is detected as a prospective contour point which is considered to be present on the contour of the irradiation field and which stands in the first prospectiveness rank, and the peak a2 is detected as a prospective contour point standing in the second prospectiveness rank. In this example, the prospective contour point a1 standing in the first prospectiveness rank is present in a predetermined center region. Therefore, the prospective contour point a1 standing in the first prospectiveness rank is employed as the prospective contour point on the line extending to the positive direction of the $\xi$ axis.

In the region extending from the center point C to the negative direction of the $\xi$ axis, curve B has three major peaks b1, b2 and b3. Among the peaks b1, b2 and b3, the peak b1 is the highest, and the peak b3 is the lowest. Therefore, the peak b1 is detected as a prospective contour point standing in the first prospectiveness rank, the peak b2 is detected as a prospective contour point standing in the second prospectiveness rank, and the peak b3 is detected as a prospective contour point standing in the third prospectiveness rank. In this example, the prospective contour point b1 is located in a peripheral region E close to the edge of the stimulable phosphor sheet 1, and the prospective contour points b2 and b3 are present in the center region D. Therefore, the prospective contour point b1 is eliminated, and the prospective contour point b2 standing in the higher prospectiveness rank between the prospective contour points b2 and b3 located in the center region D is taken as the first-ranking prospective contour point. The first-ranking prospective contour point b2 is employed as the prospective contour point on the line extending to the negative direction of the $\xi$ axis.

In cases where a prospective contour point is present only in the peripheral region E and no prospective contour point is present in the center region D, it is considered that the contour of the irradiation field is located in the peripheral region E, and therefore the prospective contour point present in the peripheral region E is employed as the prospective contour point.

The operation for detecting the prospective contour point along each line need not necessarily be designed so that a plurality of prospective contour points are detected during a single operation (for example, so that the prospective contour points b1, b2 and b3 are detected by a single differentiating operation carried out from the center point C to the leftward direction along the arrow F shown in FIG. 1). For example, as indicated by the arrow G in FIG. 1, the prospective contour point b1 standing in the first prospectiveness rank may first be detected. When the prospective contour point b1 thus detected is present in the peripheral region E, the detecting operation may then be carried out from the prospective contour point b1 toward the center point C in order to detect the next prospective contour point. Alternatively, as indicated by the arrows H, H shown in FIG. 1, the prospective contour point b1 standing in the first prospectiveness rank may first be detected. When the prospective contour point b1 thus detected is present in the peripheral region E, the standard for the detection of the prospective contour point may then be lowered by way of example, and the detecting operation may be carried out with the lowered standard from the the center point C along the same line in order to detect the next prospective contour point.

In the manner described above, prospective contour points 6, 6, ... are detected respectively on a plurality of lines each of which connects the center point C with the edge of the stimulable phosphor sheet 1. (The prospective contour points ultimately detected in the manner described above will hereinbelow be referred to as the contour points.) After the contour points 6, 6, ... . are detected, lines connecting them may be recognized as the contour of the irradiation field. The lines connecting the contour points 6, 6, ... can be found by using one of several methods, for example, a method wherein prospective contour points remaining after a smoothing process has been carried out are connected together, a method wherein a plurality of straight lines are found by locally applying the method of least squares and the straight lines are then connected together, or a method wherein a spline curve or the like is applied. In this embodiment, the image processing means 29 finds a plurality of straight lines connecting the contour points by utilizing a Hough transformation. The processing done to find the straight lines will hereinbelow be described in detail.

Figure 2:
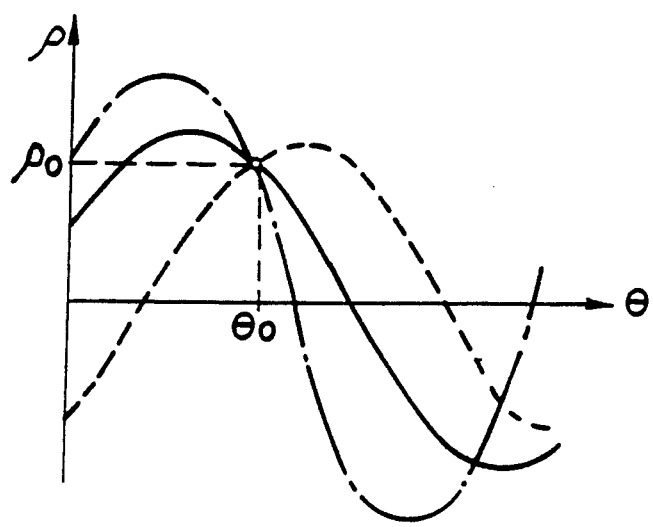
FIG. 2 is an explanatory graph showing a method for detecting straight lines which connect prospective contour points of an irradiation field.

A corner (the lower corner of the left edge) of the stimulable phosphor sheet 1 shown in FIG. 1 is taken as an origin, and the x and y axes are set as shown in FIG. 1. Coordinates of the contour points are expressed as (x1,y1), (x2,y2), ..., (xn,yn). These coordinates are represented by (xo,yo). As shown in FIG. 2, the image processing means 29 calculates the curves expressed as $$\rho = xo \cos\theta + yo \sin\theta$$

where xo and yo are constants, for each contour point coordinate (xo,yo). FIG. 2 shows the curves thus obtained, and the number of curves equals the number of the contour point coordinates (xo,yo).

Figure 3:
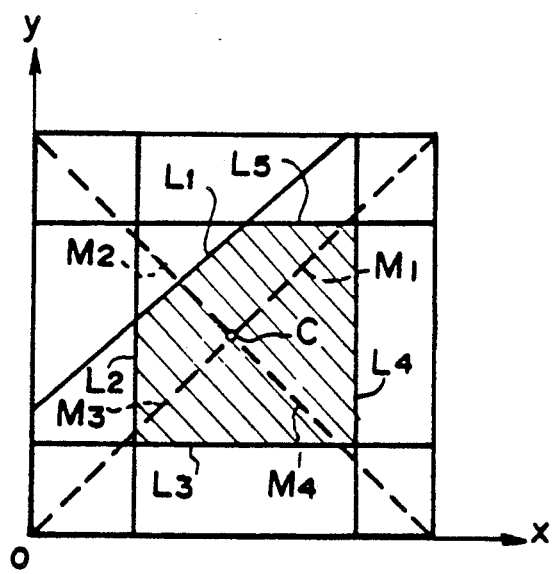
FIG. 3 is an explanatory view showing a method for extracting a region surrounded by straight lines which connect prospective contour points of an irradiation field.

Then, the image processing means 29 calculates the coordinates ($\rho o, \theta o$) of the points where the curves intersect and where the number of curves intersecting at each point ($\rho o, \theta o$) is not smaller than a predetermined number Q. Because of errors in finding the contour point coordinates (xo,yo), many curves rarely intersect exactly at a single point. Therefore, by way of example, in the case where multiple sets of two curves have intersections spaced from one another by only small distances not longer than a predetermined distance, the point of intersection at the middle of the group of the intersections is taken as the aforesaid intersection ($\rho o, \theta o$). Then, from each intersection ($\rho o, \theta o$), the image processing means 29 calculates a straight line expressed as $$\rho o = x \cos\theta o + y \sin\theta o$$

on the x-y orthogonal coordinate system. The straight line thus calculated extends along a plurality of the contour point coordinates (xo,yo). In cases where the contour points 6, 6, ... are distributed as shown in FIG. 1, the straight lines are obtained as straight lines L1, L2, L3, L4 and L5 shown in FIG. 3 which are the extensions of the lines forming the contour of the irradiation field 3 shown in FIG. 1. The image processing means 29 then detects the region surrounded by a plurality of straight lines L1, L2, L3, ..., Ln obtained in this manner, and recognizes said region as the irradiation field 3. Specifically, for example, the region is recognized in the manner described below. The image processing means 29 stores line segments M1, M2, M3, ..., Mm connecting the corners of the stimulable phosphor sheet 1 with the center point C (four line segments in cases where the stimulable phosphor sheet 1 is rectangular), and detects whether or not each of the line segments M1 to Mm intersects with each of the straight lines L1 to Ln. In cases where an intersection is present, the image processing means 29 divides the stimulable phosphor sheet 1 into two regions: one including the corner of the stimulable phosphor sheet 1 to which the line segment is connected and delineated by the straight line and the other including the remainder of the stimulable phosphor sheet 1. The image processing means 29 then discards the region including the corner. This operation is carried out for all of the straight lines L1 to Ln and the line segments M1 to Mm, and the region surrounded by the straight lines L1 to Ln is not discarded. The region thus obtained is recognized as the irradiation field 3 shown in FIG. 1.

After recognizing the irradiation field, the image processing means 29 carries out appropriate image processing on the image signal SQ corresponding to the region inside of the irradiation field.

In the aforesaid embodiment, the center point C of the stimulable phosphor sheet 1 is employed as the point located in the region inside of the irradiation field, and differentiation processing is started on image signal components representing image information stored at positions neighboring the center point C of the stimulable phosphor sheet 1. However, any position inside of the irradiation field may be employed as said point located in the region inside of the irradiation field. For example, in cases where the irradiation field is limited to a very small area, the center point C of the stimulable phosphor sheet may be present in the region outside of the irradiation field. In such cases, as said point, there should be selected a position which always lies in the region inside of the irradiation field, for example, a position at which the density level is the highest among the density levels on the stimulable phosphor sheet, a position at which the center of gravity of the density is located, or a position at which the center of gravity in the region on a high density side is located when the image density levels are converted into the two-valued system.

The method for recognizing an irradiation field in accordance with the present invention is also applicable when a preliminary read out is carried out in order to obtain a preliminary read-out image signal, an irradiation field is detected on the basis of the preliminary read-out image signal, and the read-out condition for the final read out is adjusted on the basis of the preliminary read-out image signal corresponding to the region inside of the irradiation field.

The method for recognizing an irradiation field in accordance with the present invention is not limited to the aforesaid embodiment wherein a stimulable phosphor sheet is used, and is also applicable to, for example, an X-ray image read-out apparatus wherein conventional X-ray film is used.

Figure 5:
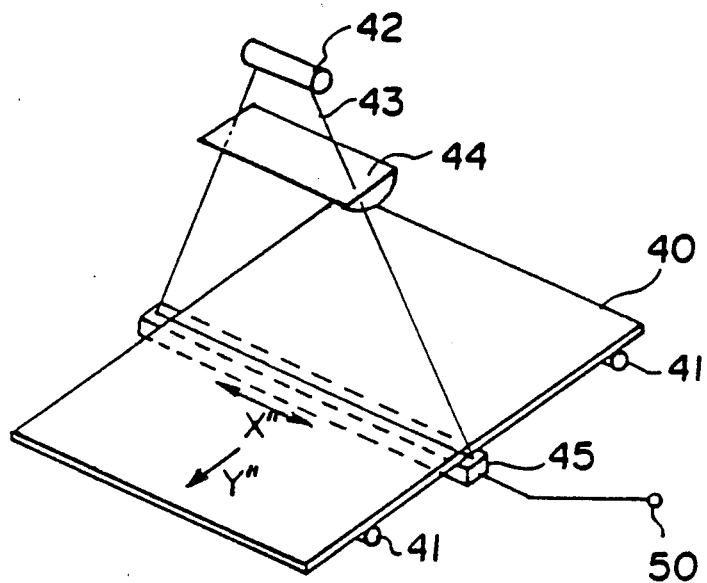
FIG. 5 is a perspective view showing an example of the X-ray image read-out apparatus wherein an X-ray image recorded on an X-ray film is read out.

With reference to FIG. 5, a sheet of X-ray film 40 on which an X-ray image has been recorded is placed at a predetermined position, and is conveyed in the direction indicated by the arrow Y" by a film conveyance means 41.

Reading light 43 produced by an elongated light source 42 extending in one direction is converged by a cylindrical lens 44, and is linearly irradiated onto the X-ray film 40 along the directions indicated by the arrow X", which are approximately normal to the direction indicated by the arrow Y". A MOS sensor 45 is positioned below the X-ray film 40 so that the MOS sensor 45 can receive the reading light 43 which has passed through the X-ray film 40, the intensity of which light has been modulated in accordance with the X-ray image recorded on the X-ray film 40. The MOS sensor 45 comprises a plurality of solid stat photoelectric conversion devices which are arrayed linearly at intervals equal to the intervals between the picture elements of the X-ray image along directions indicated by the arrow X". As long as the X-ray film 40 is conveyed in the direction indicated by the arrow Y‴ while being exposed to the reading light 43, the MOS sensor 45 detects the reading light, which has passed through the X-ray film 40, at predetermined intervals corresponding to the intervals between the picture elements of the X-ray image along the direction indicated by the arrow Y‴.

Figure 6:
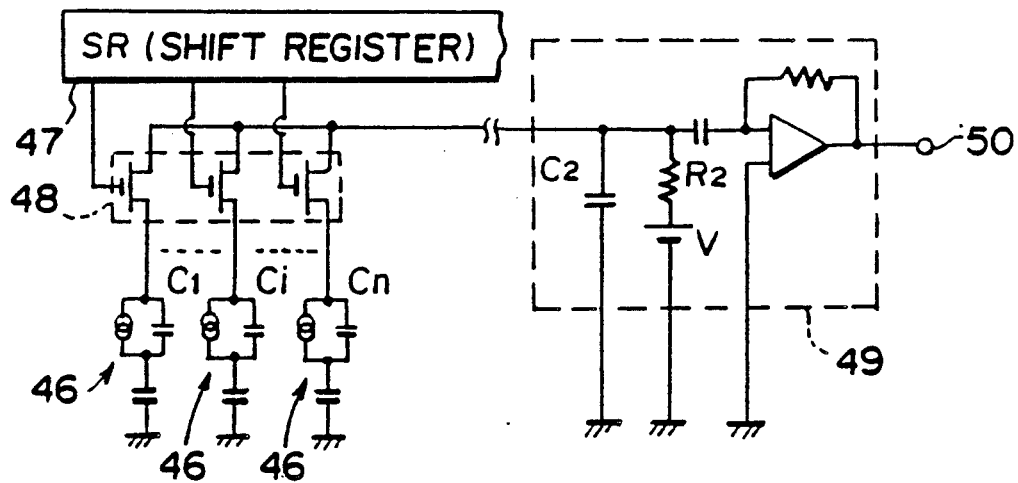
FIG. 6 is a circuit diagram showing an equivalent circuit for a MOS sensor.

FIG. 6 shows an equivalent circuit for the MOS sensor 45.

With reference to FIG. 6, photocarriers generated when the reading light 43 impinges upon the solid state photoelectric conversion devices 46, 46, . . . accumulate in capacitors Ci (i=1, 2, . . . , n) of the solid state photoelectric conversion devices 46, 46, . . . The number of photocarriers which accumulate in the capacitors Ci is detected by sequentially turning on and off the switches of a switch section 48. A shift register 47 controls the switches of the switch section 48, and a time-serial image signal is obtained. The image signal is then amplified by a pre-amplifier 49 and is output at an output terminal 50 of the pre-amplifier 49.

The analog image signal output by the MOS sensor 45 is sampled and digitized into an image signal. Thereafter, the X-ray irradiation field is recognized based on the digital image signal in the same manner as in the aforesaid embodiment. In the embodiment shown in FIG. 5, the MOS sensor 45 may be replaced by a charge coupled device (CCD) or a charge priming device (CPD). Also, the X-ray image may be read out from the X-ray film 40 by two-dimensionally scanning the X-ray film 40 with a light beam in the same manner as that described above for image read-out from the stimulable phosphor sheet. Furthermore, instead of detecting light which has passed through the X-ray film 40, light reflected by the X-ray film 40 may be detected.

The method for recognizing an irradiation field in accordance with the present invention is applicable to various types of radiation image read-out and reproducing apparatuses wherein an image signal is obtained by reading out a radiation image of an object from a recording medium, on which the radiation image has been recorded, and wherein a visible image is reproduced from the image signal.

An embodiment of the first method for judging the correctness or incorrectness of a prospective contour point of an irradiation field in accordance with the present invention will be described hereinbelow.

Figure 9:
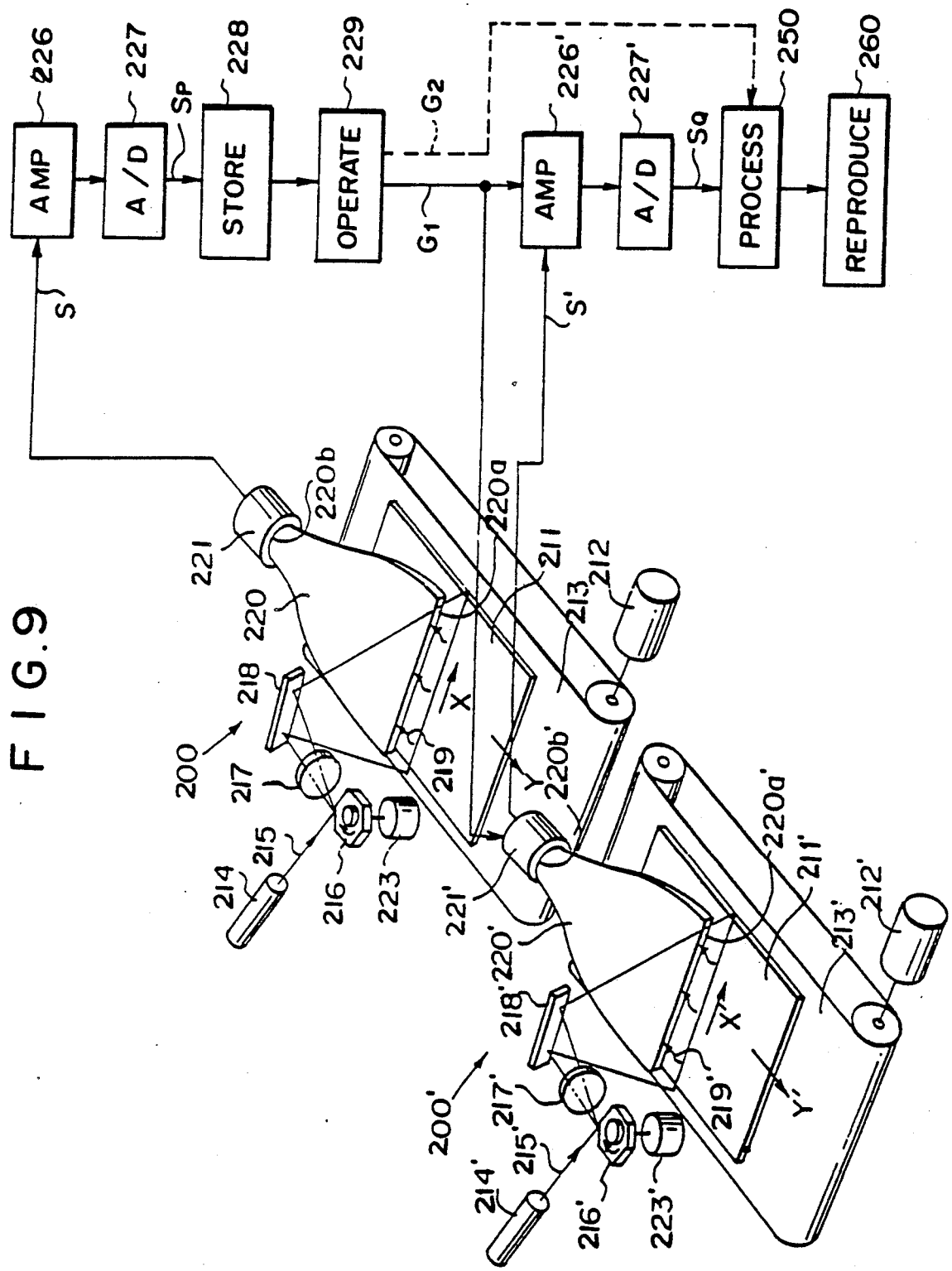
FIG. 9 is a perspective view showing an example of the radiation image read-out and reproducing apparatus wherein an embodiment of the method for judging the correctness or incorrectness of a prospective contour point of an irradiation field in accordance with the present invention is employed.

With reference to FIG. 9, an example of the radiation image read-out and reproducing apparatus, wherein an embodiment of the first method for judging the correctness or incorrectness of a prospective contour point of an irradiation field in accordance with the present invention is employed, utilizes a stimulable phosphor sheet and carries out preliminary read out.

A stimulable phosphor sheet 211 on which a radiation image has been stored is placed at a predetermined position in a preliminary read-out means 200 which carries out preliminary read out by scanning the stimulable phosphor sheet 211 with a light beam having a low energy level, thereby releasing only part of the energy stored during exposure to radiation from the stimulable phosphor sheet 211. The stimulable phosphor sheet 211 is conveyed in a sub-scanning direction indicated by the arrow Y by a sheet conveyance means 213 which is constituted of an endless belt or the like and which is operated by a motor 212. On the other hand, a laser beam 215 having a low energy level produced by a laser beam source 214 is reflected and deflected by a rotating polygon mirror 216 which is being quickly rotated by a motor 223 in the direction indicated by the arrow, and caused to pass through a converging lens 217 constituted of an fθ lens or the like. The direction of the optical path of the laser beam 215 is then changed by a mirror 218, and the laser beam 215 is caused to impinge upon the stimulable phosphor sheet 211 and scan it in a main scanning direction indicated by the arrow X, which direction is approximately normal to the sub-scanning direction indicated by the arrow Y. When the stimulable phosphor sheet 211 is exposed to the laser beam 215, the exposed portion of the stimulable phosphor sheet 211 emits light 219 in an amount proportional to the amount of energy stored thereon during exposure to radiation. The emitted light 219 is guided by a light guide member 220, and photoelectrically detected by a photomultiplier 221 which acts as a photodetector. The light guide member 220 is made by the forming of a light guiding material such as an acrylic plate, and has a linear light input face 220a positioned to extend along the main scanning line on the stimulable phosphor sheet 211, and a ring-shaped light output face 220b positioned so that it is in close contact with a light receiving face of the photomultiplier 221. The emitted light 219 which has entered the light guide member 220 from its light input face 220a is guided through repeated total reflection inside of the light guide member 220, emanates from the light output face 220b, and is received by the photomultiplier 221. In this manner, the amount of the emitted light 219 carrying the radiation image is converted into an electric signal by the photomultiplier 221.

An analog output signal S generated by the photomultiplier 221 is amplified by an amplifier 226, and digitized by an A/D converter 227 into a preliminary read-out image signal SP.

In the preliminary read out, a read out condition such as the voltage applied to the photomultiplier 221 or the amplification factor of the amplifier 226 is adjusted so that image information can be detected for a wide range in the amount of energy stored on the stimulable phosphor sheet 211 during exposure to radiation.

The preliminary read-out image signal SP obtained in the manner described above is fed into a storage means 228 and stored therein. Thereafter, the preliminary read-out image signal SP is read from the storage means 228, and fed into an operation means 229. The operation means 229 recognizes the irradiation field on the stimulable phosphor sheet 211 on the basis of the preliminary read-out image signal SP. Based on the preliminary read-out image signal SP corresponding to the region inside of the recognized irradiation field, the operation means 229 calculates the read-out condition G1 for the final read out, such as the voltage applied to a photomultiplier 221' or the amplification factor of an amplifier 226'.

A stimulable phosphor sheet 211' on which the preliminary read out has been finished is placed at a predetermined position in the final read-out means 200', and scanned with a light beam 215' having an energy level higher than that of the light beam 215 used in the preliminary read-out. In this manner, an image signal SQ is detected on the basis of the read-out condition G1 adjusted as described above. The configuration of the final read-out means 200' is nearly the same as that of the preliminary read-out means 200, and therefore elements corresponding to those constituting the preliminary read-out means 200 are numbered with corresponding primed reference numerals in FIG. 9.

After the image signal SQ is digitized in an A/D converter 227', the image signal SQ is fed into an image processing means 250, which carries out appropriate image processing of the image signal SQ. After being image processed, the image signal is fed into a reproducing apparatus 260, which reproduces a visible image by use of the image signal.

How the operation means 229 recognizes the irradiation field on the basis of the preliminary read-out image signal SP will be described hereinbelow.

Figure 7:
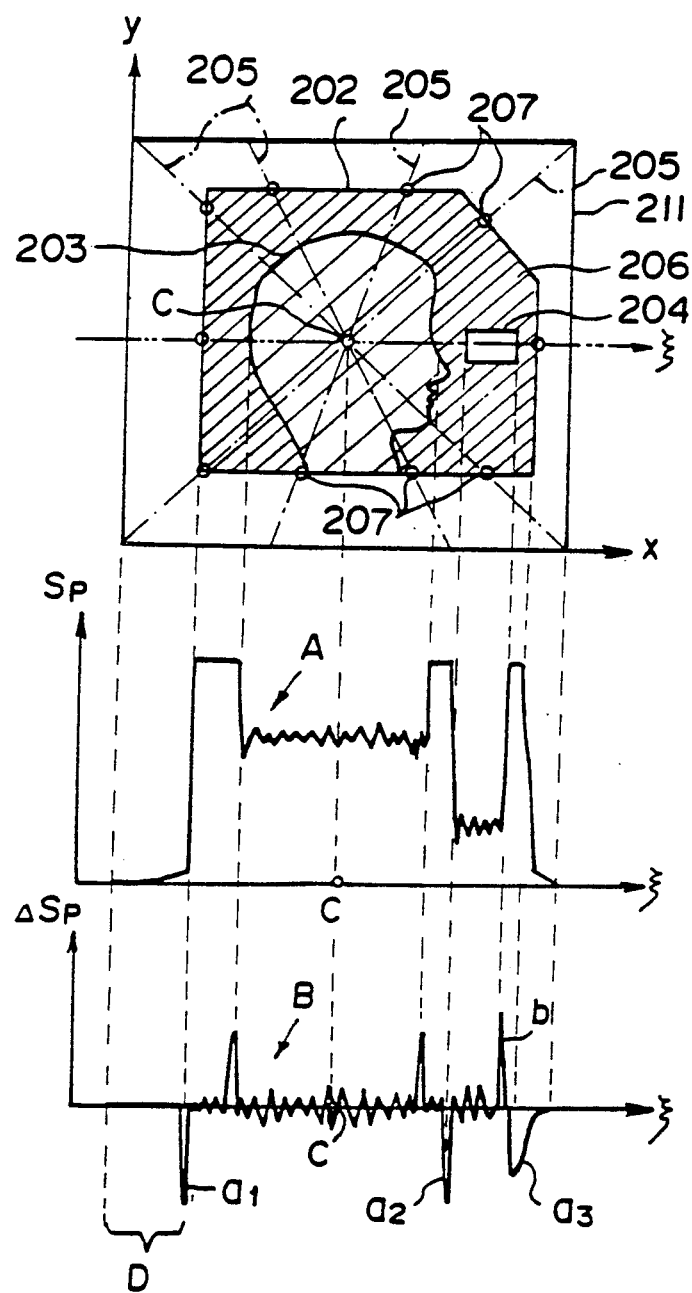
FIG. 7 is an explanatory view showing an example of the radiation image, a preliminary read-out image signal representing the radiation image, and differentiated values of the preliminary read-out image signal.

For the explanation of the embodiment of the first method for judging the correctness or incorrectness of a prospective contour point of an irradiation field in accordance with the present invention, FIG. 7 shows an example of the radiation image, a preliminary read-out image signal SP representing the radiation image, and differentiated values ΔSP obtained by differentiation processing of the preliminary read-out image signal SP.

With reference to FIG. 7, an object image 203 of the head of a human body as an object is stored in the region inside of an irradiation field 202 on the stimulable phosphor sheet 211. Also, an image 204 of a foreign substance is stored in the region inside of the irradiation field 202. For example, the image 204 of the foreign substance is an image of a character constituted of a lead plate, which image has been recorded together wit the image of the object in the region inside of the irradiation field 202.

In this embodiment, the center point C of the stimulable phosphor sheet 211 is selected as a predetermined point located in the region inside of the irradiation field 202. Differentiating operations are carried out on the image signal components of the preliminary read-out image signal SP corresponding to the picture elements arrayed along each of a plurality of lines 205, 205, . . . which extend radially from the center point C. The point at which the value of the preliminary read-out image signal SP decreases sharply is detected as a prospective contour point.

How the prospective contour point is detected along the ξ axis which is one of the lines 205, 205, . . . will be described hereinbelow.

Curve A represents the values of the image signal components of the preliminary read-out image signal SP corresponding to the picture elements arrayed along the ξ axis.

The values of the image signal components of the preliminary read-out image signal SP are the largest in a background region 206 which is located outside of the object image 203 and the foreign substance image 204 in the region inside of the irradiation field 202 and upon which radiation impinged directly. The values of the image signal components of the preliminary read-out image signal SP decrease sharply at the contour of the irradiation field 202, and the values change sharply at the boundary between the foreign substance image 204 and the neighboring part of the background region 206.

Curve B represents the results of differentiation carried out on the image signal components of the preliminary read-out image signal SP represented by curve A from the center point C to the negative direction of the ξ axis (i.e. leftward in FIG. 7) and to the positive direction of the ξ axis (i.e. rightward in FIG. 7).

Curve B has only a single major peak a1 which projects downwardly on the line extending from the center point C to the negative direction of the ξ axis. Also, there is no upwardly projecting peak in the region D on the outward side of the peak a1. Therefore, the position on the stimulable phosphor sheet 211 which corresponds to the peak a1 is determined as the prospective contour point on the line extending from the center point C to the negative direction of the ξ axis.

On the line extending from the center point C to the positive direction of the ξ axis, curve B has two major peaks a2 and a3 which project downwardly (i.e two prospective contour point are present). However, an upwardly projecting peak b is present between the peaks a1 and a2. The peak b arises characteristically only in the image signal components corresponding to region inside of the irradiation field 202. Such a high upwardly projecting peak does not arise in the image signal components corresponding to the region outside of the irradiation field 202. Because the peak b is present, the position corresponding to the peak a2 is eliminated from the prospective contour points and the position corresponding to the peak a3 is employed as the prospective contour point on the line extending from the center point C to the positive direction of the ξ axis.

The operation for detecting the prospective contour point along each line may be carried out by algorithms wherein a plurality of prospective contour points (for example, the peaks a2 and a3 in this embodiment) are detected during a single operation, prospective contour points are then selected from a plurality of the detected prospective contour points on the basis of whether or not the change point characteristically arising only in the image signal components corresponding to the region inside of the irradiation field is present, and the position which is most suitable as the prospective contour point among the selected prospective contour points (for example, the position at which the height of the peak is the largest among the downwardly projecting peaks located on the outward side of the change point) is ultimately detected as the prospective contour point. Alternatively, the operation for detecting the prospective contour point along each line may be carried out by algorithms which detect only a single prospective contour point at one time. For example, the algorithms may be designed so that the differentiating operation is sequentially carried out on the image signal components from those corresponding to the center point C toward the outward image side, thereby to detect a prospective contour point (which corresponds to the peak a2 in this embodiment), the differentiating operation is then carried out on the image signal components corresponding to the positions on the more outward image side, and the detected prospective contour point (which corresponds to the peak a2 in this embodiment) is canceled when the change point arising characteristically only in the image signal components corresponding to the region inside of the irradiation field 202 is present. Thereafter, the differentiating operation is carried out on the image signal components corresponding to the positions on the more outward image side of the change point, thereby to detect a prospective contour point (which corresponds to the peak a3 in this embodiment).

In the manner described above, prospective contour points 207, 207, . . . are detected respectively on a plurality of the lines 205, 205, . . . each of which connects the center point C with the edge of the stimulable phosphor sheet 211. (The prospective contour points ultimately detected in the manner described above will hereinbelow be referred to as the contour points.) After the contour points 207, 207, . . . are detected, lines connecting them may be recognized as the contour of the irradiation field. The lines connecting the contour points 207, 207, ... can be found by using one of several methods as described above. In this embodiment, the operation means 229 finds a plurality of straight lines connecting the contour points 207, 207, ... by utilizing a Hough transformation in the same manner as the image processing means 29 shown in FIG. 4.

Figure 8:
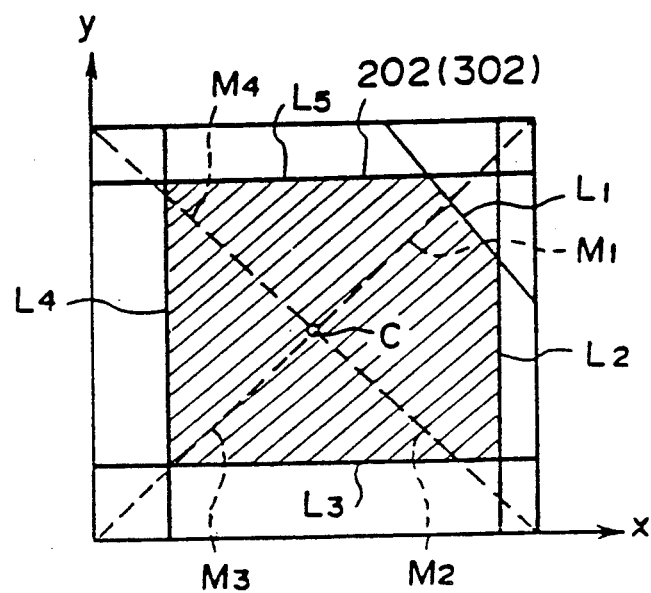
FIG. 8 is an explanatory view showing a method for extracting a region surrounded by straight lines which connect prospective contour points of an irradiation field.

In cases where the contour points 207, 207, ... are distributed as shown in FIG. 7, the straight lines connecting the contour points 207, 207, ... are obtained as straight lines L1, L2, L3, L4 and L5 shown in FIG. 8 which are the extensions of the lines forming the contour of the irradiation field 202 shown in FIG. 7. The operation means 229 then detects the region surrounded by a plurality of straight lines L1, L2, L3, ..., Ln obtained in this manner, and recognizes said region as the irradiation field 202. Specifically, for example, the region is recognized in the manner described below. The operation means 229 shown in FIG. 9 stores line segments M1, M2, M3, ..., Mm connecting the corners of the stimulable phosphor sheet 211 with the center point C (four line segments in cases where the stimulable phosphor sheet 211 is rectangular), and detects whether or not each of the line segments M1 to Mm intersects with each of the straight lines L1 to Ln. In cases where an intersection is present, the operation means 229 divides the stimulable phosphor sheet 211 into two regions: one including the corner of the stimulable phosphor sheet 211 to which the line segment is connected and delineated by the straight line and the other including the remainder of the stimulable phosphor sheet 211. The operation means 229 then discards the region including the corner. This operation is carried out for all of the straight lines L1 to Ln and the line segments M1 to Mm, and the region surrounded by the straight lines L1 to Ln is not discarded. The region thus obtained is recognized as the irradiation field 202 shown in FIG. 7.

After the irradiation field 202 is recognized, the read-out condition for the final read out is adjusted based on the preliminary read-out image signal SP corresponding to the region inside of the irradiation field 202 so that the image signal representing the image information stored in the region inside of the irradiation field 202 is detected appropriately.

In this embodiment, the center point C of the stimulable phosphor sheet 211 is employed as the point located in the region inside of the irradiation field, and differentiation processing is started on image signal components representing image information stored at positions neighboring the center point C of the stimulable phosphor sheet 211. However, any position inside of the irradiation field may be employed as said point located in the region inside of the irradiation field. For example, in cases where the irradiation field is limited to a very small area, the center point C of the stimulable phosphor sheet may be present in the region outside of the irradiation field. In such cases, as said point, there should be selected a position which always lies in the region inside of the irradiation field, for example, a position at which the value of the preliminary read-out image signal is the largest, a position at which the center of gravity of the picture elements is located when the picture elements are weighted with the values of the image signal component of the preliminary read-out image signal, or a position at which the center of gravity of the picture elements corresponding to the region on a larger value side of the preliminary read-out image signal is located when the preliminary read-out image signal is converted into the two-valued system.

An embodiment of the second method for judging the correctness or incorrectness of a prospective contour point of an irradiation field in accordance with the present invention will be described hereinbelow.

In this embodiment, the operation means 229 in the radiation image read-out and reproducing apparatus shown in FIG. 9 recognizes the irradiation field on the basis of the preliminary read-out image signal SP in the manner described below.

Figure 10:
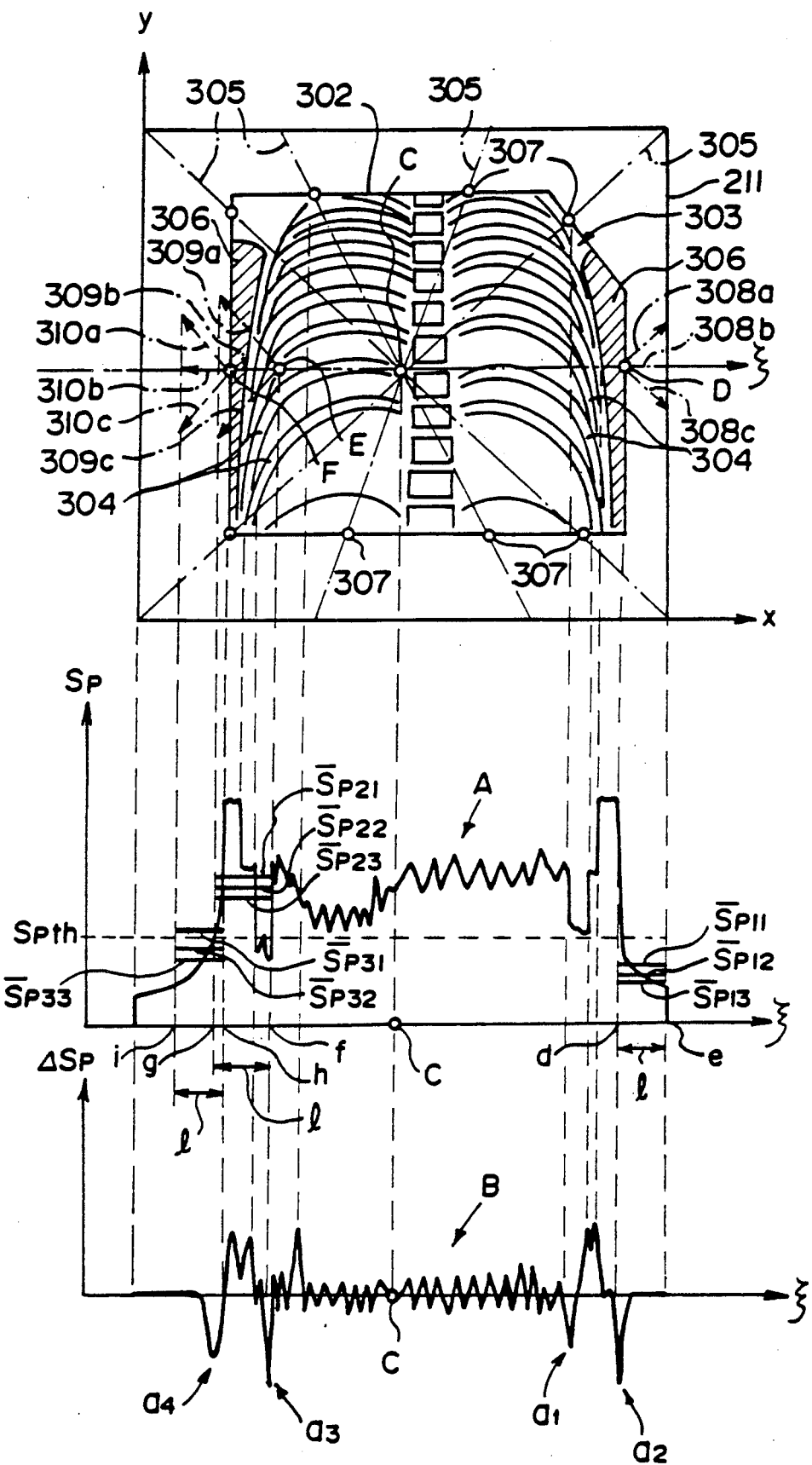
FIG. 10 is an explanatory view showing an example of the radiation image, a preliminary read-out image signal representing the radiation image, and differentiated values of the preliminary read-out image signal.

For the explanation of the embodiment of the second method for judging the correctness or incorrectness of a prospective contour point of an irradiation field in accordance with the present invention, FIG. 10 shows an example of the radiation image, a preliminary read-out image signal SP representing the radiation image, and differentiated values $\Delta SP$ obtained by differentiation processing of the preliminary read-out image signal SP.

With reference to FIG. 10, an object image 303 of the frontal chest of a human body as an object is stored in the region inside of an irradiation field 302 on the stimulable phosphor sheet 211.

In this embodiment, the center point C of the stimulable phosphor sheet 211 is selected as a predetermined point located in the region inside of the irradiation field 302. Differentiating operations are carried out on the image signal components of the preliminary read-out image signal SP corresponding to the picture elements arrayed along each of a plurality of lines 305, 305, ... which extend radially from the center point C. The point at which the value of the preliminary read-out image signal SP decreases sharply is detected as a prospective contour point.

How the prospective contour point is detected along the $\xi$ axis which is one of the lines 305, 305, ... will be described hereinbelow.

Curve A represents the values of the image signal components of the preliminary read-out image signal SP corresponding to the picture elements arrayed along the $\xi$ axis.

The values of the image signal components of the preliminary read-out image signal SP are the largest in a background region 306 which is located outside of the object image 303 in the region inside of the irradiation field 302 and upon which radiation impinged directly. The values of the image signal components of the preliminary read-out image signal SP decrease sharply at the contour of the irradiation field 302, and the values change sharply at the contour of rib images 304, 304, ...

Curve B represents the results of differentiation carried out on the image signal components of the preliminary read-out image signal SP represented by curve A from the center point C to the positive direction of the $\xi$ axis (i.e. rightward in FIG. 10) and to the negative direction of the $\xi$ axis (i.e. leftward in FIG. 10).

Curve B has major peaks a1 and a2 which project downwardly on the line extending from the center point C to the positive direction of the $\xi$ axis. The peak a2 is higher than the peak a1, and therefore the position D corresponding to the peak a2 is determined as the prospective contour point. Thereafter, calculations are made to find mean values $\overline{SP11}$, $\overline{SP12}$ and $\overline{SP13}$ of the image signal components of the preliminary read-out image signal SP corresponding to the picture elements arrayed along lines 308a, 308b and 308c, respectively.

Each of the lines 308a, 308b and 308c extends from the prospective contour point D to the direction that goes away from the center point C, and each line has a length l along the $\xi$ axis (i.e. the length between points d and e on the $\xi$ axis). The mean values $\overline{SP11}$, $\overline{SP12}$ and $\overline{SP13}$ are compared with a predetermined value SPth (threshold value). In this example, the mean $\overline{SP11}$, $\overline{SP12}$ and $\overline{SP13}$ are smaller than the predetermined value SPth, and therefore the lines 308a, 308b and 308c are judged to be present in the region outside of the irradiation field 302. Accordingly, the prospective contour point D is judged to be present on the contour of the irradiation field 302.

On the line extending from the center point C to the negative direction of the $\xi$ axis, Curve B has major peaks a3 and a4 which project downwardly. The peak a3 is higher than the peak a4, and therefore the position E corresponding to the peak a3 is determined as the prospective contour point. Thereafter, calculations are made to find mean values $\overline{SP21}$, $\overline{SP22}$ and $\overline{SP23}$ of the image signal components of the preliminary read-out image signal SP corresponding to the picture elements arrayed along lines 309a, 309b and 309c, respectively. Each of the lines 309a, 309b and 309c extends from the prospective contour point E to the direction that goes away from the center point C, and each line has the length l along the $\xi$ axis (i.e. the length between points f and g on the $\xi$ axis). The mean values $\overline{SP21}$, $\overline{SP22}$ and $\overline{SP23}$ are compared with the predetermined value SPth. In this example, the mean values $\overline{SP21}$, $\overline{SP22}$ and $\overline{SP23}$ are larger than the predetermined value SPth and therefore it is judged that the prospective contour point E is not present on the contour of the irradiation field 302 and is thus incorrect.

Because the prospective contour point E corresponding to the peak a3 has been judged to be incorrect, the position corresponding to the peak a4 is then determined as the prospective contour point F on the line extending from the center point C to the negative direction of the $\xi$ axis. Thereafter, in the same manner as that described above, calculations are made to find mean values $\overline{SP31}$, $\overline{SP32}$ and $\overline{SP33}$ of the image signal components of the preliminary read-out image signal SP corresponding to the picture elements arrayed along lines 310a, 310b and 310c, respectively. Each of the lines 310a, 310b and 310c extends from the prospective contour point F to the direction that goes away from the center point C, and each line has the length l along the $\xi$ axis (i.e. the length between points h and i on the $\xi$ axis). The mean values $\overline{SP31}$, $\overline{SP32}$ and $\overline{SP33}$ are compared with the predetermined value SPth. In this example, the mean value $\overline{SP31}$ is larger than the predetermined value SPth, whereas the mean values $\overline{SP32}$ and $\overline{SP33}$ are smaller than the predetermined value SPth. In this embodiment, it is judged under majority rule that the prospective contour point F is present on the contour of the irradiation field 302 and is thus correct.

In the aforesaid embodiment, three lines are employed as the lines extending from the prospective contour point in the direction that goes away from the center point C, and the mean values of the values of the image signal components along the three lines are calculated. However, the number of the lines is not limited to three, and is selected in accordance with the length of the time required to carry out the operations and the accuracy of the judgment required. Also, in the aforesaid embodiment, the mean value of the values of the image signal components is employed as the characteristic value because the amount of radiation to which the stimulable phosphor sheet 211 is exposed during the image recording is small in the region outside of the irradiation field. However, as the characteristic value, it is possible to employ one of various representative values of the image signal components corresponding to the picture elements arrayed along each line, for example, the median value of the values of said image signal components, the maximum value among the values of said image signal components, or the value of the formula expressed as (maximum value among the values of said image signal components + minimum value among the values of said image signal components)/2. Alternatively, because the image is approximately uniform and exhibits little change in the region outside of the irradiation field, the variance of the values of said image signal components, the mean value of the absolute values of the differentiated values which are obtained from differentiation of the values of said image signal components along said line, or the variance of said differentiated values may be employed as the characteristic value. Also, a plurality of different types of characteristic values may be used in combination, thereby to improve the accuracy of the judgment.

Also, in this embodiment, the center point C of the stimulable phosphor sheet 211 is employed as the point located in the region inside of the irradiation field 302, and differentiation processing is started on image signal components representing image information stored at positions neighboring the center point C of the stimulable phosphor sheet 211. However, any position inside of the irradiation field 302 may be employed as said point located in the region inside of the irradiation field. For example, in cases where the irradiation field is limited to a very small area, the center point C of the stimulable phosphor sheet may be present in the region outside of the irradiation field. In such cases, as said point, there should be selected a position which always lies in the region inside of the irradiation field, for example, a position at which the value of the preliminary read-out image signal is the largest, a position at which the center of gravity of the picture elements is located when the picture elements are weighted with the values of the image signal components of the preliminary read-out image signal, or a position at which the center of gravity of the picture elements corresponding to the region on a larger value side of the preliminary read-out image signal is located when the preliminary read out image signal is converted into the two-valued system.

In the manner described above, contour points 307, 307, . . . are detected respectively on a plurality of the lines 305, 305, . . . each of which connects the center point C with the edge of the stimulable phosphor sheet 211. After the contour points 307, 307, . . . are detected, lines connecting them may be recognized as the contour of the irradiation field. The lines connecting the contour points 307, 307, . . . can be found by using one of several methods as described above. In this embodiment, the operation means 229 finds a plurality of straight lines connecting the contour points 307, 307, . . . by utilizing a Hough transformation in the same manner as the image processing means 29 shown in FIG. 4.

In cases where the contour points 307, 307, . . . are distributed as shown in FIG. 10, the straight lines connecting the contour points 307, 307, . . . are obtained as straight lines L1, L2, L3, L4 and L5 shown in FIG. 8 which are the extensions of the lines forming the contour of the irradiation field 302 shown in FIG. 10. The operation means 229 then detects the region surrounded by a plurality of straight lines L1, L2, L3, ..., Ln in the same manner as that described above with reference to FIG. 8, and recognizes said region as the irradiation field 302.

After the irradiation field 302 is recognized, the read-out condition for the final read out is adjusted based on the preliminary read-out image signal SP corresponding to the region inside of the irradiation field 302 so that the image signal representing the image information stored in the region inside of the irradiation field 302 is detected appropriately.

In the aforesaid embodiments of the first and second methods for judging the correctness or incorrectness of a prospective contour point of an irradiation field in accordance with the present invention, the preliminary read-out means 200 and the final read-out means 200' are separate from each other. Alternatively, because the configurations of the preliminary read-out means 200 and the final read-out means 200' are approximately identical to each other, a single read-out means may be utilized for performing both the preliminary read out and the final read out. In this case, after the preliminary read out is carried out by the scanning of the stimulable phosphor sheet 211 with a light beam having a low energy level, the stimulable phosphor sheet 211 may be moved back to the position at which the image read out is started. Thereafter, the final read out may be carried out by scanning the stimulable phosphor sheet 211 with a light beam having a high energy level.

In cases where a single read-out means is utilized to perform both the preliminary read out and the final read out, it is necessary to change the intensity of the light beam used in the preliminary read out and the final read out. For this purpose, various methods may be employed as described above, for example, a laser beam source or the like may change the intensity of the light beam.

In the aforesaid embodiments of the first and second methods for judging the correctness or incorrectness of a prospective contour point of an irradiation field in accordance with the present invention, the read-out condition for the final read out is adjusted by the operation means 229. Alternatively, the final read out may be carried out by using a predetermined read-out condition regardless of the characteristics of the preliminary read-out image signal SP. On the basis of the preliminary read-out image signal SP, the operation means 229 may adjust an image processing condition G2 to be used in the image processing means 250 which carries out image processing of the image signal SQ. The image processing condition G2 calculated by the operation means 229 may then be fed into the image processing means 250 as indicated by the broken line in FIG. 9. The operation means 229 may also adjust both the read-out condition and the image processing condition.

The first and second methods for judging the correctness or incorrectness of a prospective contour point of an irradiation field in accordance with the present invention are also applicable to radiation image read-out apparatuses wherein no preliminary read-out operations are carried out, and only the aforesaid final read-out operations are carried out. In these cases, an image signal is obtained by use of a predetermined read-out condition. Based on the image signal, an image processing condition is calculated by an operation means. The calculated image processing condition is taken into consideration when the image signal is processed.

The first and second methods for judging the correctness or incorrectness of a prospective contour point of a irradiation field in accordance with the present invention are not limited to the aforesaid embodiments wherein a stimulable phosphor sheet is used, and are also applicable to, for example, the X-ray image read-out apparatus wherein conventional X-ray film is used as described above with reference to FIGS. 5 and 6.

The first and second methods for judging the correctness or incorrectness of a prospective contour point of an irradiation field in accordance with the present invention are applicable to various types of radiation image read-out apparatuses wherein a radiation image of an object is read out from a recording medium, on which the radiation image has been recorded, thereby to obtain an image signal comprising image signal components corresponding to the picture elements on the recording medium.

I claim:

1. A method for recognizing an irradiation field wherein an image signal comprising a plurality of image signal components corresponding to picture elements on a recording medium, on which a radiation image of an object has been recorded, is obtained, and an irradiation field on the recording medium is recognized on the basis of the image signal components, wherein the improvement comprises the steps of:
i) on each of a plurality of radial lines each of which connects a predetermined point located in the region inside of said irradiation field on said recording medium with an edge of said recording medium, detecting a single prospective contour point, which is considered to be an intersection of each said line and a contour of said irradiation field on said recording medium, or a plurality of such prospective contour points, together with prospectiveness ranks of the prospective contour points, on the basis of the image signal components corresponding to the picture elements arrayed along each said line,
ii) in cases where said prospective contour points detected on each said line are present in both a predetermined peripheral region close to the edge of said recording medium and a center region on the inward side of said peripheral region, and a prospective contour point standing in the first prospectiveness rank is present in said peripheral region, changing the prospectiveness ranks of said prospective contour points so that the first prospectiveness rank is given to a prospective contour point which is in the highest rank among the prospective contour points located in said center region, and
iii) recognizing said irradiation field on the basis of the first-ranking prospective contour points which are thus determined on said lines.

2. A method for recognizing an irradiation field as defined in claim 1 wherein said recording medium is a stimulable phosphor sheet on which a radiation image has been stored, and said image signal is obtained from a read-out operation wherein said stimulable phosphor sheet is exposed to stimulating rays which cause it to emit light in proportion to the amount of energy stored during exposure to radiation, and the emitted light is detected photoelectrically.

3. A method for judging the correctness or incorrectness of a prospective contour point of an irradiation field, which comprises the steps of, after image read out from a recording medium, on which a radiation image of an object has been recorded, is carried out in order to obtain an image signal comprising a plurality of image signal components corresponding to picture elements on the recording medium:

i) on a line which connects a predetermined point located in the region inside of an irradiation field on said recording medium with an edge of said recording medium, detecting prospective contour points, each of which is considered to be an intersection of said line and a contour of said irradiation field, on the basis of the image signal components corresponding to the picture elements arrayed along said line,
  ii) detecting a change point of said image signal components arrayed along said line, which change point arises characteristically only in the region inside of said irradiation field, and
  iii) in cases where said change point has been detected, judging that a prospective contour point located on the predetermined point side of said change point is not present on the contour of said irradiation field and is thus incorrect.

4. A method for judging the correctness or incorrectness of a prospective contour point of an irradiation field as defined in claim 3 wherein said recording medium is a stimulable phosphor sheet on which a radiation image has been stored, and said image signal is obtained from a read out operation wherein said stimulable phosphor sheet is exposed to stimulating rays which cause it to emit light in proportion to the amount of energy stored during exposure to radiation, and the emitted light is detected photoelectrically.

5. A method for judging the correctness or incorrectness of a prospective contour point of an irradiation field, which comprises the steps of, after image read-out from a recording medium, on which a radiation image of an object has been recorded, is performed to obtain an image signal comprising a plurality of image signal components corresponding to picture elements on the recording medium:

i) extending a line from a predetermined point located in the region inside of an irradiation field on said recording medium to an edge of said recording medium, and detecting a prospective contour point, which is considered to be an intersection of said line and a contour of said irradiation field, based on the image signal components corresponding to the picture elements arrayed along said line,
  ii) after detecting said prospective contour point, calculating a characteristic value of the image signal components corresponding to the picture elements arrayed along a single line or along each of a plurality of lines, each line extending from said prospective contour point in a direction leading away from said predetermined point,
  iii) comparing said characteristic value with a predetermined value, and
  iv) based on the comparison of said characteristic value with said predetermined value, confirming whether said prospective contour point is present on the contour of said irradiation field.

6. A method for judging the correctness or incorrectness of a prospective contour point of an irradiation field as defined in claim 5 wherein said recording medium is a stimulable phosphor sheet on which a radiation image has been stored, and said image signal is obtained from a read-out operation wherein said stimulable phosphor sheet is exposed to stimulating rays which cause it to emit light in proportion to the amount of energy stored during exposure to radiation, and the emitted light is detected photoelectrically.

7. A method for judging the correctness or incorrectness of a prospective contour point of an irradiation field, said method comprising the steps of:

performing image read-out from a recording medium, on which a radiation image of an object has been recorded, to obtain an image signal comprising a plurality of image signal components corresponding to picture elements on said recording medium;
  extending a line from a predetermined point located in the region inside of an irradiation field on said recording medium to an edge of said recording medium;
  detecting prospective contour points, each of which is considered to be an intersection of said line and a contour of said irradiation field, on the basis of the image signal components corresponding to the picture elements arrayed along said line,
  detecting a change point of said image signal components arrayed along said line, which change point arises characteristically only in the region inside of the said irradiation field, and
  after detecting said change point, judging that a prospective contour point located on the predetermined point side of said change point is not present on the contour of said irradiation field.

8. A method according to claim 7, wherein said recording medium is a stimulable phosphor sheet on which a radiation image has been stored, and said image signal is obtained from said image read-out, wherein said stimulable phosphor sheet is exposed to stimulating rays causing said sheet to emit light proportionally to the amount of energy stored during exposure to radiation, and the emitted light is detected photoelectrically.

* * * * *